Oct. 14, 1969     W. L. FLOEHR     3,472,178
RESILIENT GASKET SEALING DISCHARGE GATE ASSEMBLY
Filed Sept. 6, 1967     2 Sheets-Sheet 1
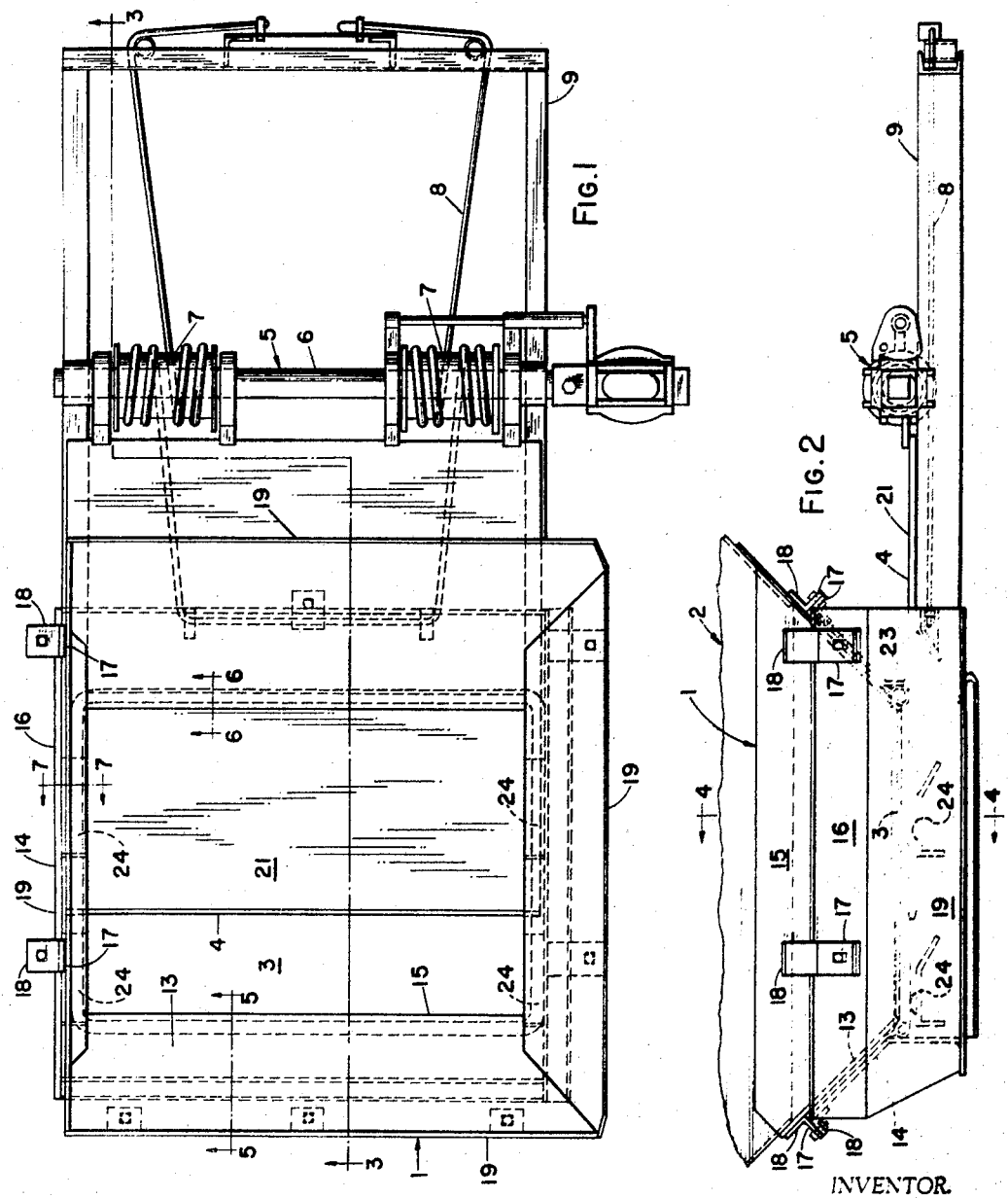
INVENTOR.
WALTER L. FLOEHR
BY Wilmer Mechlin
HIS ATTORNEY

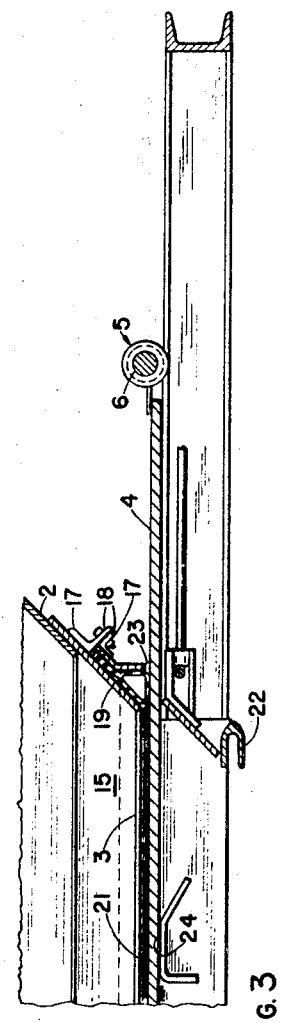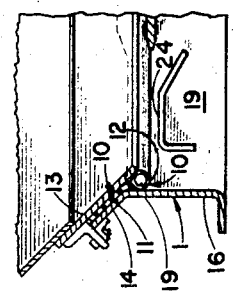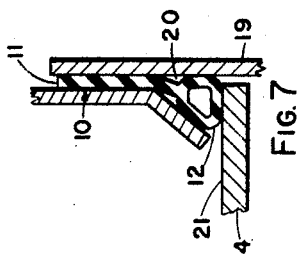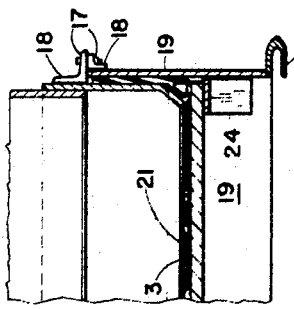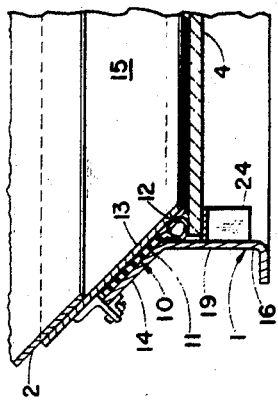

United States Patent Office 3,472,178
Patented Oct. 14, 1969

---

3,472,178
RESILIENT GASKET SEALING DISCHARGE GATE ASSEMBLY
Walter L. Floehr, Toledo, Ohio, assignor to Midland-Ross Corporation, Cleveland, Ohio, a corporation of Ohio
Filed Sept. 6, 1967, Ser. No. 665,836
Int. Cl. B61d 7/02; B60p 1/56
U.S. Cl. 105—282                                 9 Claims

ABSTRACT OF THE DISCLOSURE

A railway hopper car discharge gate assembly in which a sealing gasket is mounted between upper and lower parts of the gate frame and protected from lading by the upper part and the gasket is engaged and compressed by the upper side of the gate in the latter's closed position for sealing against escape of lading.

BACKGROUND OF THE INVENTION

While the metal-to-metal contact between the slide gate and gate frame of a conventional hopper discharge gate assembly suffices for lading of substantial particle size, manufacturing and assembly tolerances practically prevent such a joint from sealing against escape of various finely divided materials often transported in covered hopper cars. For solving this problem a number of assemblies have been proposed, such as those disclosed in Dorey Patents Nos. 3,097,612, 3,138,116 and 3,255,714, in which a gasket carried by a frame in sealingly engageable by the gate and also so mounted as to be shielded from the lading during discharge. The present invention offers an improved solution for this problem.

SUMMARY OF THE INVENTION

The primary object of the present invention is to provide an improved discharge gate assembly depending for sealing a hopper discharge opening against escape of finely divided lading on a gasket sealingly engageable with an upper side of the gate about the opening and so mounting the gasket on the frame as to hold it against accidental displacement, while shielding it from discharging lading and permitting its ready installation and replacement. Of rubber or other suitable elastomeric material, the sealing gasket surrounds the hopper's discharge opening and preferably has a generally flat tail clamped between outer and inner releasably connected members and a hollow head depending from the tail and fitting in a downwardly opening recess between the members in positon to sealingly engage the upper side of the gate and be protected from discharging lading. The outer and inner members between which the gasket is clamped are respectively releasably connected to and rigid with the hopper to which the assembly is applied and preferably are respectively upper and lower parts of the frame having a tapered interfit.

Other objects and features of the invention will appear hereinafter in the detailed description, be particularly pointed out in the appended claims and be illustrated in the accompanying drawings, in which:

FIGURE DESCRIPTION

FIGURE 1 is a plan view of a preferred embodiment of the improved self-sealing discharge gate assembly of the present invention;

FIGURE 2 is a side elevational view of the assembly of FIGURE 1 applied to a hopper;

FIGURE 3 is a vertical sectional view taken along lines 3—3 of FIGURE 1 with the assembly applied to a hopper;

FIGURE 4 is a vertical sectional view taken along lines 4—4 of FIGURE 2; and

FIGURES 5, 6 and 7 are fragmentary vertical sectional views on an enlarged scale taken along lines 5—5, 6—6 and 7—7, respectively, of FIGURE 1.

DETAILED DESCRIPTION

Referring now in detail to the drawings in which like reference characters designate like parts, the improved self-sealing discharge gate assembly of the present invention is comprised of a frame 1 attachable to a downwardly opening hopper 2 of a railway hopper car (not otherwise shown) about a discharge opening 3 and slidably mounting a discharge or slide gate 4 slidable or shiftable between positions to open and close the opening. In the illustrated embodiment the gate 4 conveniently is moved or shifted, generally horizontally, between open and closed positions by gate operating mechanism 5, such as that disclosed in my copending application Ser. No. 631,543, filed Apr. 17, 1967, the mechanism having an operating shaft 6 connected for longitudinal movement in unison to the gate and mounting pulleys 7 winding or turning in a cable 8 connected at opposite longitudinal extremities to the frame 1 and an extension or outrigger 9 projecting forwardly from the frame.

Mounted on the frame 1 is a sealing gasket 10 of rubber or other suitable elastomeric material which preferably is of unitary or one-piece construction and extends uninterruptedly or continuously about or surrounds or encircles the discharge opening 3. The preferred gasket 10 has an upstanding tail or flange 11 which usually will be solid and, while permissibly ribbed, is generally flat. The tail 11 terminates downwardly or is joined or merges at its lower end in a hollow bulbous or tubular head 12 which in free condition is of circular or other suitable cross-section. In the assembly the gasket 10 has its tail 11 fitted or sandwiched and clamped, compressed or held between confronting or adjoining sides or side walls 13 and 14, respectively, of an inner member 15 and an outer member 16.

Embracing, receiving or nesting about the lower portion of the inner member 15, the outer member 16 is releasably connected or attached thereto, conveniently by bolting through outstanding connecting legs or flanges 17 of L-irons 18 fixed, as by welding, to the outsides of the walls 13 and 14. While the inner member 15 in any case should be rigid with the hopper 2 and may have as its sides 13 downward extensions of the hopper's sides or side sheets 19, it preferably is an upper part of the frame 1, which, when installed, fits about or around and, as by riveting or welding, is fixed to or made rigid with the hopper.

Over their areas between which the tail 11 of the gasket 10 is clamped or held, the inner and outer side walls 13 and 14 preferably are flat and parallel. However, therebelow, one wall is bent away or diverges from the other to form therebetween a downwardly opening recess or pocket 20 in which the hollow head 12 of the gasket 10 fits, seats or is received. The discharge opening 3 closable by the gate 4 in the illustrated embodiment, is at the bottom of the inner or upper frame member 15 and bounded at the sides by the side walls 13 of that member. The recess 20 laterally contains the gasket head 12 and it and the head are spaced outwardly by the same side walls 13 from and surround or encircle the discharge opening 3 and extend, each at a uniform level, around the frame 1 parallel to the plane of the opening.

While contained laterally in the recess 20, the gasket head 12 projects or extends below the recess and, when free or disengaged from the gate 4, also below the gate's conveniently flat or planar upper side or surface 21. Preferably round-nosed so as not to cut the gasket head in closing, the gate 4 in closed position and suitably also in moving or sliding between open and closed positions, has its upper surface 21 disposed parallel to the plane of the discharge opening 3. Metal-to-metal contact between the gate and the side walls 13 at the sides of the discharge opening is neither necessary nor particularly desirable but it is necessary that the upper surface 21, presented to the opening in the gate's closed position, be of greater area than and project or extend laterally or transversely at all sides beyond the opening sufficiently to underlie and engage the gasket head 12 about the opening.

Compressible and normally or in absence of the gate 4 extending below the level of the gate's upper surface 21, the gasket head 12, when rubbed against or engaged by that surface, is deformed or compressed upwardly into the recess 20 and, by sealingly engaging the gate around the entire periphery of the opening, effectively seals against escape of even finely divided lading. Conversely, the lateral containment of the head in the recess enables the side walls 13 about the discharge opening 3 to shield or protect the gasket head from the lading during discharge of the latter on opening of the gate and this shielding action is particularly effective, if, is illustrated, those portions inwardly bounding the recess of all of the side walls slops inwardly toward their bottom extremities.

The detachable outer or lower frame member 16 conveniently mounts the frame extension or outrigger 9 and the gate 4 and its operating mechanism 5 and also will usually carry at the bottom a channel 22 for attachment of a conventional canvas or like guide chute (not shown). Except for the side wall 14 at the front of the outer member, which is interrupted by a laterally extending slot 23 for receiving the gate 4, the side walls 14 of the outer member ordinarily will be closed and those at the sides of the member will be provided with instanding slides or guides 24 which cooperate with the frame extension 9 in slidably supporting the gate over its range of movement. If, as illustrated, the lower or both of the frame members 15 and 16 are of weldment construction, the slides 24 conveniently may be at each side of a pair or plurality of longitudinally spaced slide or guide brackets fixed to and instanding from the side wall 14 at that side of the outer member.

With the frame 1 and the sealing gasket 10 constructed in the above manner, installation and replacement of the gasket is simply a matter of attaching or detaching the lower frame member 16 to or from the fixed upper member 15 without disturbing the fixed connection of the latter to the hopper 2. When installed, the gasket both fully seals the discharge opening 3 by engagement with the gate 4 in the latter's closed position and is fully shielded from discharging lading when the gate is open. Also, the gasket is held firmly in place by the clamping action exerted on its tail 11 by the parts of the outer and inner members between which the tail is sandwiched and compressed as they are drawn together, if, as preferred and suited for the usual hopper, those parts have a tapered or wedging fit as a result of the downward and inward slope of the sandwiching areas of the side walls 13 and 14 at at least a pair of intersecting or adjoining sides of the frame 1. If desired, the gasket can be held in position by aperturing its tail 11 at spaced points and bolting the confronting parts of the upper and lower members to each other through the tail at those points, but such positioning usually will be only precautionary and of real benefit only when the tapered fit is absent.

From the above detailed description it will be apparent that there has been provided an improved self-sealing discharge gate assembly which will effectively seal against the escape of finely divided lading and both protects and permits ready replacement of its sealing means. It should be understood that the described and disclosed embodiment is merely exemplary of the invention and that all modifications are intended to be included that do not depart from the spirit of the invention and the appended claims.

Having now described my invention, I claim:

1. A self-sealing discharge gate assembly for a hopper of a railway hopper car, comprising wall means connected to the hopper and bounding a downwardly opening discharge opening therefor, frame means fitting about and releasably connected to said wall means, a discharge gate slidable in said frame means below said wall means for opening and closing said discharge opening, said wall and frame means forming therebetween a downwardly opening recess around said discharge opening, and elastomeric gasket means surrounding said discharge opening and having a tail held between said wall and frame means about said recess and a head fitting in and projecting below said recess and sealingly engageable with an upper surface of said gate on closing thereof for sealing against escape of lading from said assembly, said head being laterally contained in and laterally restricted by said recess for shielding by said wall means from discharging lading on opening of said gate.

2. A self-sealing discharge gate assembly according to claim 1, wherein areas of the wall and frame means between which the tail is held have a tapered fit for clamping the tail between said means on attachment thereof.

3. A self-sealing discharge gate assembly according to claim 2, wherein the wall means are side walls of an upper frame member fixed to the hopper, and the frame means is a lower frame member releasably connected to said upper frame member.

4. A self-sealing discharge gate assembly according to claim 3, wherein the tail and head of the gasket means are respectively solid and hollow and are compressed respectively by connection of the upper and lower frame members and by engagement with the upper surface of the gate.

5. A self-sealing discharge gate assembly according to claim 4, wherein confronting side walls of the upper and lower frame members are substantially parallel over the areas thereof holding the tail and diverge therebelow to form the recess.

6. A self-sealing discharge gate assembly according to claim 5, including means releasably connecting the upper and lower frame members, said connecting means being so directed as to enable an upward force to be applied during connection of the members to the lower member for compressing the gasket tail between the members.

7. A self-sealing discharge gate assembly according to claim 6, wherein the portions of the side walls of the upper frame member inwardly bounding the recess slope inwardly toward the discharge opening for deflecting discharging lading inwardly from the gasket head.

8. A self-sealing discharge gate assembly according to claim 1, wherein the recess and gasket head extend around the opening at uniform levels parallel to a plane of the opening.

9. A self-sealing discharge gate assembly according to claim 2, wherein the portion of the wall means inwardly bounding the recess slopes inwardly toward the discharge opening for deflecting discharging lading inwardly from the head of the gasket means.

References Cited

UNITED STATES PATENTS

| | | | |
|---|---|---|---|
| 743,504 | 11/1903 | Hart | 105—424 X |
| 2,094,979 | 10/1937 | Dietrichson | 105—282 |
| 3,075,477 | 1/1963 | Sinhoff | 105—283 X |
| 3,138,116 | 6/1964 | Dorey | 105—424 X |

ARTHUR L. LA POINT, Primary Examiner

HOWARD BELTRAN, Assistant Examiner

U.S. Cl. X.R.

105—295, 300, 306, 424